3,046,253
PREPARATION OF POLYMERIC PRODUCTS FROM CYANURATES
Louis Schmerling, Riverside, Ill., assignor to Universal Oil Products Company, Des Plaines, Ill., a corporation of Delaware
No Drawing. Filed Apr. 11, 1960, Ser. No. 21,101
12 Claims. (Cl. 260—77.5)

This application is a continuation-in-part of my copending application Serial Number 412,050, filed February 23, 1954, now abandoned.

This invention relates to a process for preparing polymeric products by polymerizing cyanurates containing at least one olefinic substituent with organic hydrocarbons and more particularly, to a process for reacting triolefinic substituted cyanurates with saturated and unsaturated organic hydrocarbons.

An object of this invention is to prepare polymeric products which may be used per se or in admixture with other plastics.

A further object of this invention is to provide a method for preparing polymeric products by the reaction of the cyanurate containing unsaturated substituents with saturated hydrocarbonaceous compounds.

One embodiment of this invention resides in a process for the preparation of a polymeric product which comprises reacting a cyanurate containing at least one olefinic substituent with a saturated hydrocarbon containing at least 3 carbon atoms in the presence of a free radical generating catalyst at a reaction temperature at least as high as the decomposition temperature of the catalyst.

A further embodiment of the invention is found in the process for the preparation of a polymeric product which comprises reacting a cyanurate containing at least one olefinic substituent with a saturated hydrocarbon containing at least 3 carbon atoms in the presence of an organic peroxide catalyst at a reaction temperature at least as high as the decomposition temperature of the catalyst.

Another embodiment of the invention resides in a process for the preparation of a polymeric product which comprises reacting a triolefinic substituted cyanurate with a saturated hydrocarbon containing at least 3 carbon atoms in the presence of a free radical generating catalyst at a reaction temperature at least as high as the decomposition temperature of the catalyst.

Another embodiment of the invention resides in a process for the preparation of a polymeric product which comprises reacting a triolefinic substituted cyanurate with a saturated hydrocarbon containing at least 3 carbon atoms and ethylene in the presence of a free radical generating catalyst at a reaction temperature at least as high as the decomposition temperature of the catalyst.

A specific embodiment of the invention resides in a process for the preparation of a polymeric product which comprises reacting a triolefinic substituted cyanurate with an alkane containing at least 3 carbon atoms in the presence of an organic peroxide catalyst at a reaction temperature at least as high as the decomposition temperature of the catalyst.

A more specific embodiment of the invention resides in a process for the preparation of a polymeric product which comprises reacting triallyl cyanurate with methylcyclohexane in the presence of di-t-butyl peroxide at a temperature in the range of from about 130° to about 140° C.

Other objects and embodiments referring to alternative cyanurates containing at least one olefinic substituent, saturated hydrocarbons containing at least 3 carbon atoms and peroxy compound catalysts will be found in the following further detailed description of the invention.

It is known that triallyl cyanurate may be polymerized to a hard material by heating the triallyl cyanurate in the presence of peroxides. It has now been found that cyanurates containing at least one olefinic substituent, and preferably three olefinic substituents, such as triallyl cyanurate, may be reacted with saturated hydrocarbons or mixtures of saturated hydrocarbons and unsaturated hydrocarbons in the presence of free radical generating catalysts such as peroxy compounds to form polymeric products of the cyanurate and the hydrocarbons. These products comprise resinous materials and consist of either white or colored extremely porous powders or solids capable of being pulverized to powders. The thus formed polymeric products possess remarkably low densities, are non-wettable and are highly electrostatic non-conductors. The resinous materials may be used per se as plastics, or may be admixed with other plastics and used for molding compounds, laminates, coating compositions, adhesives, etc.

Cyanurates containing at least one olefinic substituent, said olefin comprising either a straight or branched chain of from 2 to 12 carbon atoms, which may be used in the process of this invention include vinyl cyanurate, divinyl cyanurate, trivinyl cyanurate, allyl cyanurate, diallyl cyanurate, triallyl cyanurate, butenyl cyanurates, dibutenyl cyanurates, tributenyl cyanurates, pentenyl cyanurates, etc., 1,3-butadienyl cyanurates, di(1,3-butadienyl)cyanurates, tri(1,3-butadienyl)cyanurates, tri(1,3-pentadienyl)cyanurates, etc. The triallyl cyanurate is a preferred cyanurate because of its relative cost and because it yields products having desirable properties.

The saturated hydrocarbons which may be used in the process of this invention include paraffins and cycloparaffins containing at least 3 carbon atoms per molecule and preferably, containing from 4 to about 16 carbon atoms per molecule. Examples of such compounds include propane, butane, isobutane, n-pentane, isopentane, n-hexane, isohexane, and other branched-chain hexanes, the isomeric heptanes, octanes, nonanes, decanes, undecanes, dodecanes, tridecanes, tetradecanes, pentadecanes, hexadecanes, etc.; cycloparaffins such as cyclopropane, cyclobutane, cyclopentane, cyclohexane, cycloheptanes, cyclooctane, etc.; alkyl substituted cycloparaffins such as methylcyclopentane, ethylcyclopentane, propylcyclopentane, dimethylcyclopentane, diethylcyclopentane, methylcyclohexane, ethylcyclohexane, propylcyclopentane, dimethylcyclohexane, diethylcyclohexane, trimethylcyclohexane, etc.; methylcycloheptane and other alkylcycloheptanes, alkylcyclooctanes, etc., and polycyclic paraffins such as dicyclopentyl, dicyclohexyl, dicycloheptyl, decahydronaphthalene, etc. The preferred cycloparaffins contain five or six carbon atoms, and not more than eight carbon atoms, in the ring. In addition, if so desired, the olefinic substituted cyanurates may also be reacted with a saturated hydrocarbon of the type hereinbefore set forth and an unsaturated hydrocarbon containing an ethylenic linkage, examples of unsaturated hydrocarbons utilizable in this reaction being ethylene, propylene, 1-butene, 2-butene, 1-pentene, 2-pentene, etc., 1-octene, etc.; alkyl substituted cycloolefins such as methylcyclopentene, ethylcyclopentene, propylcyclopentene, dimethylcyclopentene, diethylcyclopentene, methylcyclohexene, ethylcyclohexene, etc., methylcycloheptene, ethylcycloheptene, etc.; and aryl substituted olefins such as styrene, phenylpropylenes, phenylbutylenes, etc.

It is also contemplated within the scope of this invention that simple substituted olefins such as haloalkenes, may be used in place of the olefins hereinbefore set forth, although not necessarily with equivalent results. Examples of these haloalkenes include vinyl chloride, allyl chloride, vinyl bromide, allyl bromide, crotyl chloride, 4-chloro-1-butene, chlorocyclopentenes, chlorocyclohexenes, bromocyclopentenes, bromocyclohexenes, etc.

The catalysts which may be used in the present process are those which are capable of forming a free radical at reaction conditions. These include peroxy compounds containing the bivalent radical —O—O—, and which are capable of inducing the copolymerizing of the cyanurates with the saturated hydrocarbons and unsaturated hydrocarbons. The organic peroxy compounds constitute a preferred class of catalysts for use in the reaction and include peracetic acid, persuccinic acid, perbenzoic acid, dimethyl peroxide, diethyl peroxide, di-t-butyl peroxide, dipropyl peroxide, acetyl benzoyl peroxide, acetyl peroxide, propionyl peroxide, butyryl peroxide, lauroyl peroxide, benzoyl peroxide, tetralin peroxide, urea peroxide, t-butyl perbenzoate, t-butyl hydroperoxide, methylcyclohexyl hydroperoxide, etc.

Other catalysts which may be used include the persulfates, perborates, and percarbonates of ammonium and the alkali metals, etc. as well as mixtures of the peroxy compounds. Only catalytic amounts, i.e. less than stoichiometric amounts, need be used in this process.

The reaction temperature employed in the process of this invention should be at least as high as the initial decomposition temperature of the free radical generating catalyst such as a peroxide compound, in order to form and liberate free radicals which promote the reaction. However, the operating temperature generally does not exceed the decomposition temperature of the catalyst by more than about 150° C. When a free radical generating catalyst such as t-butyl perbenzoate, having a decomposition temperature of approximately 115° C. is used, the operating temperature of the process is from about 115° C. to about 265° C., preferably at about 115–125° C. When di-t-butyl peroxide having a decomposition temperature of about 130° C. is used, the process is run at a temperature of from about 130° C. to about 280° C., preferably at about 130–140° C. Higher reaction temperatures may be employed, but little advantage is gained if the temperature differential is greater than the aforementioned 150° C. The general effect of increasing the operating temperature is to accelerate the copolymerization rate between the cyanurate and the hydrocarbons. However, the increased rate of copolymerization is usually accompanied by certain amounts of decomposition of the reactants. In addition the molecular weight of the product usually decreases with an increase in reaction temperature. Therefore, the reaction temperature is preferably maintained well within the upper limit of the abovementioned temperature range. The preferred operating pressure of the polymerization process of this invention is that sufficient to maintain a substantial proportion of the reactants in liquid phase and may range from atmospheric, particularly when a refluxing operation is used, to 100 atmospheres or more, the preferred range being from atmospheric to about 50 atmospheres, the pressure being that of the reactants or that supplied by an added inert gas such as nitrogen or hydrogen.

The process of this invention may be carried out in any suitable manner and may be either a batch or continuous type operation. When a batch type operation is used, a quantity of the olefinic substiuted cyanurate, the hydrocarbons, and the free radical generating substance are placed in a reactor such as a rotating or stirring autoclave for carrying out the reaction under pressure, or a flask connected to a condense for carrying out the reaction at atmospheric pressure. An inert gas may be added to the autoclave, if desired. The reactor is then heated to the desired temperature for a suitable reaction period, after which the reactor and the contents thereof are cooled to room temperature and the polymerized product is recovered by conventional means, for example, by distillation of the unreacted hydrocarbon, by filtration, etc. The unreacted components of the mixture may be reused as a portion of the starting materials.

Another method of operation of the present process is of the continuous type. In this method of operation the desired olefinic substituted cyanurate, the saturated hydrocarbon and, if so desired, the unsaturated hydrocarbon and the free radical generating substance are continuously charged to a reaction zone maintained at suitable conditions of temperature and pressure. Alternatively, the free radical generating substance may be added to the stream of reactants at a number of successive points. The reaction zone may be an unpacked vessel or coil, or it may contain an adsorbent packing material such as fire brick, alumina, dehydrated bauxite, and the like. The condensation products are separated from the reactor effluent and the unconverted reactants may be recycled to the reaction zone to form a portion of the starting material. One continuous type of process includes the compact moving bed type of operation in which the reactants and the catalyst pass either concurrently or countercurrently to each other.

Still another type of process is the slurry type process, in which the free radical generating catalyst is carried into the reaction zone as a slurry in the olefinic substituted cyanurate and the hydrocarbons.

In each of the aforementioned types of processes, the unreacted starting material may be separated out and recycled for use as a portion of the feed material, while the desired polymer is withdrawn and separated from any byproducts which also may be formed during the reaction.

The following examples are given to illustrate the process of this invention which, however, are not intended to limit the generally broad scope of the present invention in strict accordance therewith.

*Example I*

A solution of 10 g. of triallyl cyanurate in 102 g. of methylcyclohexane was heated to a temperature of 100° C. under refluxing conditions for a period of approximately 4 hours in the presence of 1 g. of benzoyl peroxide. At the end of this time the excess methylcyclohexane was removed from the reaction mixture by distillation under reduced pressure in a proper apparatus. 13 g. (118 cc. by volume; bulk density, 0.11) of a white porous powder remained.

*Example II*

A solution of 25 g. of trially cyanurate and 3 g. of di-t-butyl peroxide in 25 g. of methylcyclohexane was placed in a rotating autoclave. The autoclave was placed under 50 atmospheres of nitrogen pressure and heated to a temperature of approximately 130° to 140° C. for a period of 4 hours. At the end of this time, the autoclave was cooled to room temperature and the product subjected to distillation under reduced pressure in order to remove the excess methylcyclohexane and other volatile materials. 39 g. of a brittle yellow solid which was readily reduced to a powder was obtained from this polymerization.

*Example III*

Twenty-five g. of triallyl cyanurate and 50 g. of isopentane along with 1 g. of di-t-butyl peroxide were placed in a rotating autoclave similar to that described in Example II. The autoclave was placed under 50 atmospheres of nitrogen pressure, heated to a temperature of approximately 130° to 140° C. and maintained thereat for approximately 4 hours. At the end of this time, the autoclave was cooled to room temperature, the pressure reduced and the product separated from the unreacted material by distillation under reduced pressure. 31 g. of a white powder remained after the distillation.

*Example IV*

In this example, a solution of 27 g. of triallyl cyanurate and 2 g. of di-t-butyl peroxide in 113 g. of n-pentane was placed in a rotating autoclave. The autoclave was placed under 30 atmospheres of nitrogen pressure and heated to a temperature of 130° to 140° C. for a period of about 4 hours. At the end of this time the autoclave and contents thereof were cooled to room temperature, the excess was vented and the autoclave was opened. The reaction product was recovered and the pentane was removed by vacuum. The polymeric product comprised a white semi-solid paste which, after removal of the pentane by evacuation of the paste at 2 mm. pressure and room temperature, was a white porous powder. This polymeric product weighed 31 g. and occupied a space of 290 cc. (bulk density, 0.11).

*Example V*

A solution of 36 g. of triallyl cyanurate and 3 g. of di-t-butyl peroxide in 248 g. of decahydronaphthalene was placed in a rotating autoclave and subjected to conditions similar to that set forth above, that is, a pressure of about 30 atmospheres of nitrogen, a temperature of approximately 130° to 140° C. and a residence time of about 4 hours. At the end of this time, the autoclave was cooled to room temperature, the excess pressure was vented and the products separated from the excess decalin by shaking the product with pentane, filtering the resultant mixture under suction, and washing the product on the filter with additional pentane. The resultant porous white powder weighed 46.5 g. and occupied a space of 255 cc. (bulk density, 0.18).

*Example VI*

A solution of 25 g. of triallyl cyanurate and 100 g. of hexadecane (cetane) along with 2 g. of di-t-butyl peroxide were treated in the manner similar to that set forth in the above example, that is, a pressure of about 30 atmospheres of nitrogen, a temperatutre of approximately 130° to 140° C. and maintained thereat for a period of about 4 hours. At the end of this time, the autoclave and contents thereof were cooled to room temperature, the excess pressure was vented and the autoclave opened. The white semi-solid paste comprising the polymeric product was shaken with pentane and the resulting mixture filtered under suction. The polymeric product was then washed with additional pentane and dried under suction. The desired polymeric product comprising a white porous powder weighed 27 g. and occupied a space of 185 cc. (bulk density, 0.15).

*Example VII*

That normally gaseous paraffins may be used as diluents was shown by experiments with isobutane or propane. 30 g. of triallyl cyanurate, 3 g. of di-t-butyl peroxide, and 130 g. of liquefied isobutane (in a glass liner) cooled to —78° C. were placed in an autoclave and nitrogen was pressed in until an initial pressure of 30 atmospheres was reached. The autoclave and contents thereof were heated to a temperature of approximately 130° to 140° C. and maintained thereat for a period of about 4 hours. At the end of this time, the autoclave and contents thereof were cooled to room temperature, the excess pressure was vented and the autoclave opened. The product consisted of 36.5 g. of porous white powder which practically completely filled the liner. Evacuation of the liner at 60° C. and 1 mm. pressure left 35 g. of a fluffy white powder (bulk density, 0.11).

Similar results were obtained even when propane was used as the saturated hydrocarbon, particularly when the peroxide catalyst employed was one (for example, benzoyl peroxide) which decomposed below about 95° C. The low temperature is highly desirable in order that that much of the propane is maintained in the liquid phase during the reaction.

*Example VIII*

A solution of 40 g. of trimethallyl cyanurate and 100 g. of methylcyclohexane along with 3 g. of di-t-butyl peroxide is treated in a manner similar to that set forth in the above examples, that is, the solution is placed in a rotating autoclave which is placed under 50 atmospheres of nitrogen pressure and heated to a temperature of about 130° to 140° C. for a period of about 4 hours. At the end of this time, the autoclave and contents thereof are cooled to room temperature, the excess pressure is vented and the polymeric product is separated and recovered by conventional means hereinbefore set forth.

*Example IX*

It was desired to show that an essential reactant in this copolymerization process comprises saturated hydrocarbons and that an aromatic compound could not enter into the copolymerization process with the triallyl cyanurate. In order to determine this, 12 g. of triallyl cyanurate, 102 g. of toluene and 1 g. of benzoyl peroxide were refluxed at a temperature of approximately 113° C. for 8 hours. At the end of this time no precipitate had formed. The toluene was removed by distillation under reduced pressure and all that was left was 14 g. of a viscous yellow liquid which did not solidify.

*Example X*

In another experiment run in order to show the necessity for the presence of a saturated hydrocarbon in the process of this invention, no hydrocarbon solvent was used. 25 g. of triallyl cyanurate along with 3 g. of di-t-butyl peroxide were placed in a glass liner of a rotating autoclave, heated to a temperature of 130° to 140° C. and subjected to 40 atmospheres of initial ethylene pressure for a period of approximately 4 hours. The final pressure at the end of this time was 38 atmospheres. The product in the liner consisted of about 23 g. of a dark brown solid and about 2 g. of a dark colored oil. There was also 4 g. of an amber liquid in the autoclave outside of the liner.

*Example XI*

A solution of 25 g. of triallyl cyanurate in 25 g. of methylcyclohexane along with 3 g. of di-t-butyl peroxide was placed in a rotating autoclave, and heated to a temperature of 130° to 140° C. under 40 atmospheres of initial ethylene pressure for a period of 4 hours. At the end of this time, the final pressure was 31 atmospheres of ethylene. The excess ethylene was discharged and the autoclave was opened. The product consisted of 56 g. of a hard yellow solid wet with a relatively small amount of liquid. This product was heated to about 50° C. under 20 mm. pressure to remove unreacted methylcyclohexane and other volatile material formed during the polymerization. After the removal of this compound, there remained 48 g. of a yellow hard brittle solid.

I claim as my invention:

1. A process for the preparation of a polymeric product which comprises reacting a cyanurate of the formula

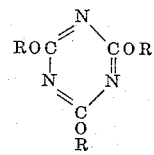

wherein R is selected from the group consisting of hydrogen and an olefinic radical of from 2 to 12 carbon atoms, at least one R being an olefinic radical of from 2 to 12 carbon atoms, with a saturated hydrocarbon selected from the group consisting of paraffins and cycloparaffins containing from 3 to about 16 carbon atoms per molecule in the presence of a free radical generating catalyst at a reaction temperature at least as high as the decomposition temperature of the catalyst.

2. The process of claim 1 further characterized in that each R in said formula is an olefinic radical of from 2 to 12 carbon atoms.

3. The process of claim 1 further characterized in that said cyanurate is also reacted with ethylene.

4. The process of claim 1 further characterized in that said catalyst is a peroxy compound.

5. The process of claim 1 further characterized in that each R in said formula is an olefinic radical of from 2 to 12 carbon atoms, said saturated hydrocarbon is n-pentane and said catalyst is an organic peroxide.

6. The process of claim 1 further characterized in that each R in said formula is an olefinic radical of from 2 to 12 carbon atoms, said saturated hydrocarbon is methylcyclohexane and said catalyst is an organic peroxide.

7. A process for preparation of a polymeric product which comprises reacting triallyl cyanurate with methylcyclohexane in the presence of di-t-butyl peroxide at a temperature in the range of from about 130° to about 140° C.

8. A process for the preparation of a polymeric product which comprises reacting triallyl cyanurate with methylcyclohexane and ethylene in the presence of di-t-butyl peroxide at a temperature in the range of from about 130° to about 140° C.

9. A process for the preparation of a polymeric product which comprises reacting triallyl cyanurate with hexadecane in the presence of di-t-butyl peroxide at a temperature in the range of from about 130° to about 140° C.

10. A process for the preparation of a polymeric product which comprises reacting triallyl cyanurate with decahydronaphthalene in the presence of di-t-butyl peroxide at a temperature in the range of from about 130° to about 140° C.

11. A process for the preparation of a polymeric product which comprises reacting triallyl cyanurate with isobutane in the presence of di-t-butyl peroxide at a temperature in the range of from about 130° to about 140° C.

12. A process for the preparation of a polymeric product which comprises reacting triallyl cyanurate with n-pentane in the presence of di-t-butyl peroxide at a temperature in the range of from about 130° to about 140° C.

References Cited in the file of this patent

UNITED STATES PATENTS

| | | |
|---|---|---|
| 2,510,503 | Kropa | June 6, 1950 |
| 2,685,576 | Fryling et al. | Aug. 3, 1954 |
| 2,719,143 | Van Dyk et al. | Sept. 27, 1955 |

OTHER REFERENCES

Gregg et al.: Faraday Soc. Discussions, volume 2, (1947), pages 328–337.